United States Patent
Su et al.

(10) Patent No.: US 9,888,240 B2
(45) Date of Patent: Feb. 6, 2018

(54) VIDEO PROCESSORS FOR PRESERVING DETAIL IN LOW-LIGHT SCENES

(71) Applicant: Apple Inc., Cupertino, CA (US)

(72) Inventors: Yeping Su, Sunnyvale, CA (US); Chris Y. Chung, Sunnyvale, CA (US); Hao Pan, Sunnyvale, CA (US); Hsi-Jung Wu, San Jose, CA (US); Ke Zhang, Leuven (BE)

(73) Assignee: APPLE INC., Cupertino, CA (US)

( * ) Notice: Subject to any disclaimer, the term of this patent is extended or adjusted under 35 U.S.C. 154(b) by 266 days.

(21) Appl. No.: 14/056,043

(22) Filed: Oct. 17, 2013

(65) Prior Publication Data

US 2014/0321534 A1 Oct. 30, 2014

Related U.S. Application Data

(60) Provisional application No. 61/817,212, filed on Apr. 29, 2013.

(51) Int. Cl.
*H04N 19/117* (2014.01)
*H04N 19/136* (2014.01)

(52) U.S. Cl.
CPC ......... *H04N 19/117* (2014.11); *H04N 19/136* (2014.11)

(58) Field of Classification Search
CPC .......................... H04N 19/136; H04N 19/117
USPC ........................ 375/240.02, 240.03
See application file for complete search history.

(56) References Cited

U.S. PATENT DOCUMENTS

| 7,787,541 B2 | 8/2010 | Osamoto et al. | |
|---|---|---|---|
| 2006/0008038 A1 | 1/2006 | Song et al. | |
| 2009/0040367 A1* | 2/2009 | Zakrzewski | B64D 45/0015 348/370 |
| 2010/0135575 A1* | 6/2010 | Guo | G06T 7/187 382/164 |
| 2010/0246689 A1* | 9/2010 | Filippini | H04N 19/124 375/240.27 |
| 2010/0309975 A1* | 12/2010 | Zhou | H04N 5/772 375/240.03 |
| 2011/0285871 A1* | 11/2011 | Sakai | G06T 5/008 348/229.1 |
| 2011/0292243 A1* | 12/2011 | Nagataki | H04N 5/2353 348/229.1 |

(Continued)

FOREIGN PATENT DOCUMENTS

WO WO 2012175195 A1 * 12/2012 .......... H04N 19/197

*Primary Examiner* — Zhihan Zhou
(74) *Attorney, Agent, or Firm* — Baker Hostetler LLP; Robert L. Hails

(57) ABSTRACT

Video coding systems and methods are provided that protect against various artifacts (e.g., banding artifacts) in decoded frame content. The embodiments to protect against introducing artifacts include pre-processing the input video frame, controlling the encoding parameters and/or post-processing the decoded video frame. A method for encoding a frame may include calculating a dark-scene score for the frame based on measured statistics of the frame. The dark-scene score may be compared to a threshold to determine if the banding artifacts may be present in the frame. Based on the comparison, filtering parameters for the frame may be altered to reduce the amount of noise filtered from the frame. The frame may be filtered based on the altered filtering parameters and encoded.

28 Claims, 7 Drawing Sheets

(56) References Cited

U.S. PATENT DOCUMENTS

| | | | | |
|---|---|---|---|---|
| 2012/0081385 A1* | 4/2012 | Cote | ............... | H04N 5/23219 |
| | | | | 345/589 |
| 2012/0093433 A1* | 4/2012 | Gupta | ............... | G06T 5/007 |
| | | | | 382/260 |
| 2012/0328029 A1 | 12/2012 | Sadafale | | |
| 2013/0046803 A1* | 2/2013 | Parmar | ............... | G09G 3/2048 |
| | | | | 708/203 |
| 2013/0064448 A1* | 3/2013 | Tomaselli | ............... | G06T 5/002 |
| | | | | 382/167 |
| 2014/0328413 A1* | 11/2014 | Esenlik | ............... | H04N 19/197 |
| | | | | 375/240.29 |

\* cited by examiner

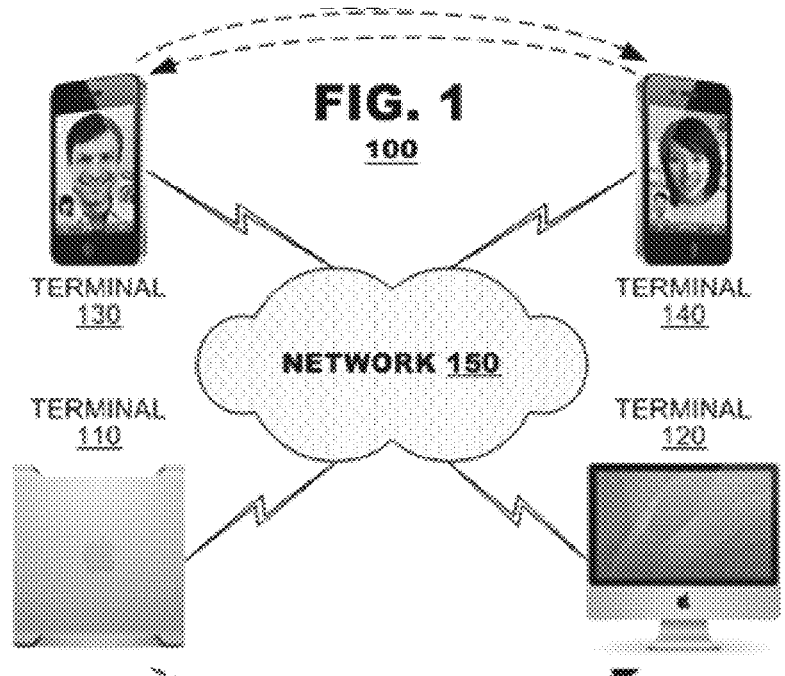
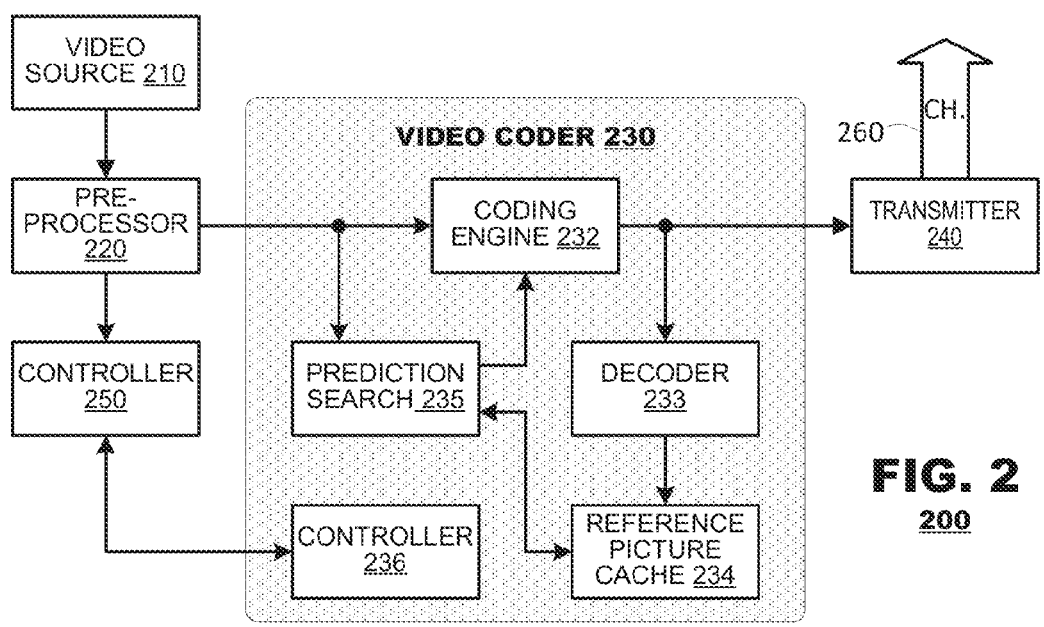

300

400

500

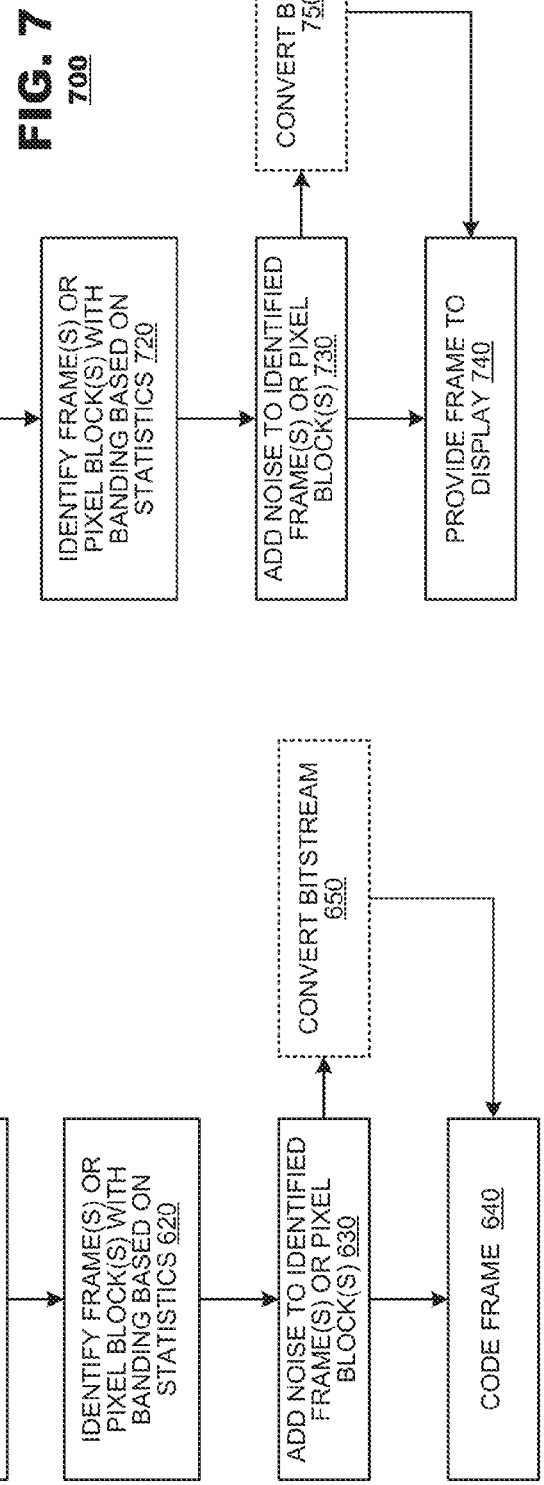

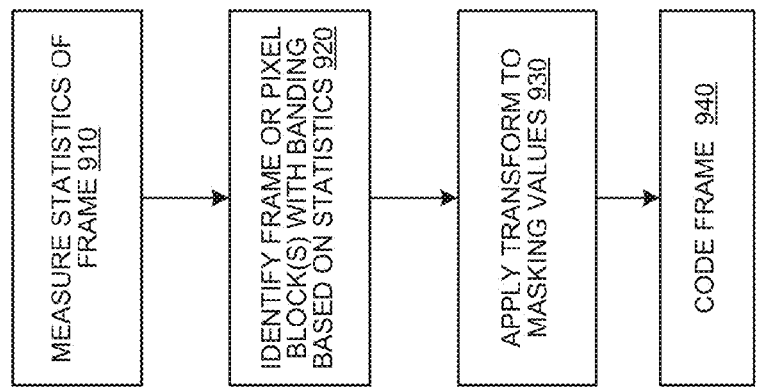
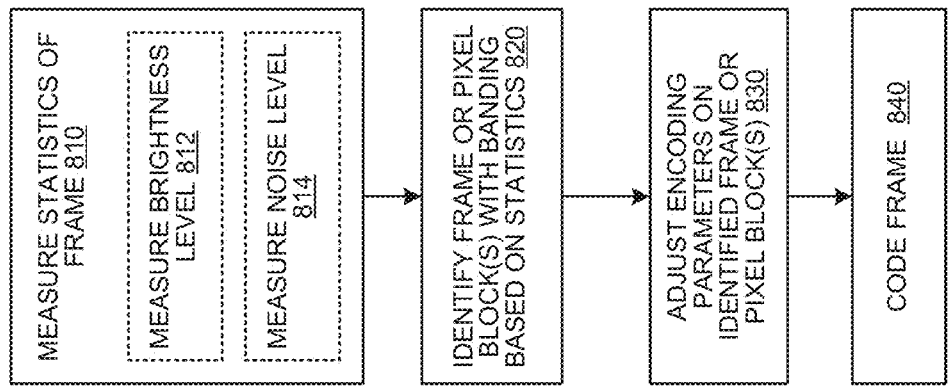

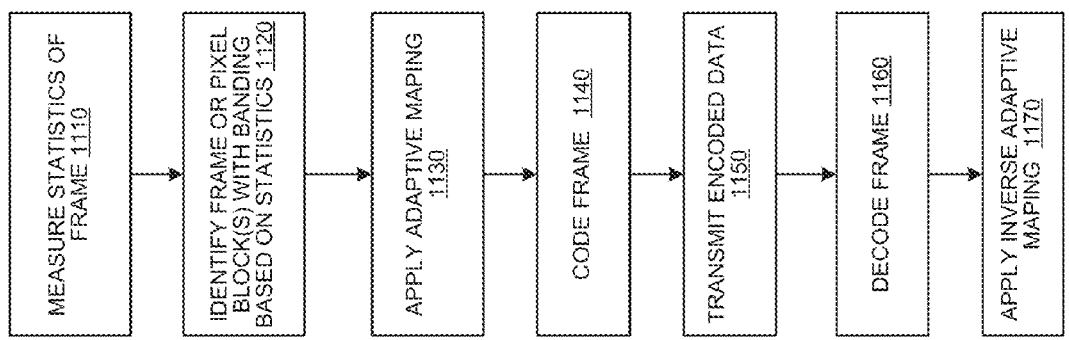
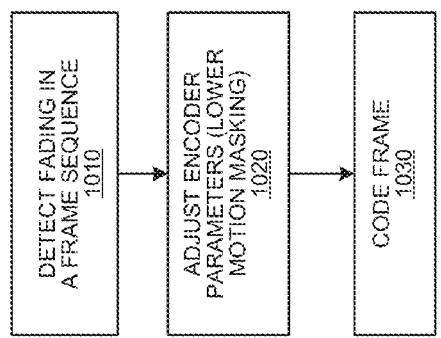

VIDEO PROCESSORS FOR PRESERVING DETAIL IN LOW-LIGHT SCENES

PRIORITY CLAIM

The present application claims priority to U.S. Provisional Application No. 61/817,212, filed on Apr. 29, 2013, the entirety of which is incorporated by reference herein.

BACKGROUND

This disclosure relates generally to the field of image and video processing. More specifically, this disclosure relates to preserving detail in low-light scenes.

A video coder may code frames of a source video sequence into a coded representation that has a smaller bit rate than the source video. The video coder may code processed video data according to any of a variety of different coding techniques to achieve compression. The resulting compressed video sequence may be transmitted to a decoder via a channel (e.g., wireless network). To recover the video data, the transmitted compressed video sequence may be decompressed at the decoder by inverting the coding processes performed by the coder, yielding a recovered video sequence.

After the compressed video sequence is decoded, a variety of undesired coding artifacts may be seen in the frames of the video sequence. The coding artifacts may include loss of details, blockiness, ringing, aliasing, posterizing and banding. These artifacts may be introduced due to preprocessing performed on the frames of the video sequence (e.g., noise filtering) and/or lossy data compression performed by the video coder. For example, banding may be introduced when the number of bits used to represent image data in a region of a frame is reduced. The reduced number bits that are available to represent a region may be insufficient to display every shade in the region of the frame. In video coder/decoder systems banding may be introduced when the video coder assigns a low number of bits to regions of a frame that have little detail, low contrast, dark regions and/or little noise.

BRIEF DESCRIPTION OF THE DRAWINGS

So that features of the present invention can be understood, a number of drawings are described below. It is to be noted, however, that the appended drawings illustrate only particular embodiments of the invention and are therefore not to be considered limiting of its scope, for the invention may encompass other equally effective embodiments.

FIG. 1 illustrates a simplified block diagram of a video coding system according to an embodiment of the present invention.

FIG. 2 is a functional block diagram of a video coding system according to an embodiment of the present invention.

FIG. 6 illustrates another embodiment of a method of detecting frames that may include banding artifacts in a video and processing the video to mitigate such effects.

FIG. 7 illustrates another embodiment of a method of detecting frames that may include banding artifacts in a video and processing the video to mitigate such effects.

FIG. 8 illustrates another embodiment of a method of detecting frames that may include banding artifacts in a video and processing the video to mitigate such effects.

FIG. 9 illustrates another embodiment of a method of detecting frames that may include banding artifacts in a video and processing the video to mitigate such effects.

FIG. 10 illustrates a method of detecting fading in a video and adjusting the encoding based on the detected fading.

FIG. 11 illustrates another embodiment of a method for detecting frames that may include banding artifacts in a video and processing the video to mitigate such effects.

DETAILED DESCRIPTION

Figure 3:
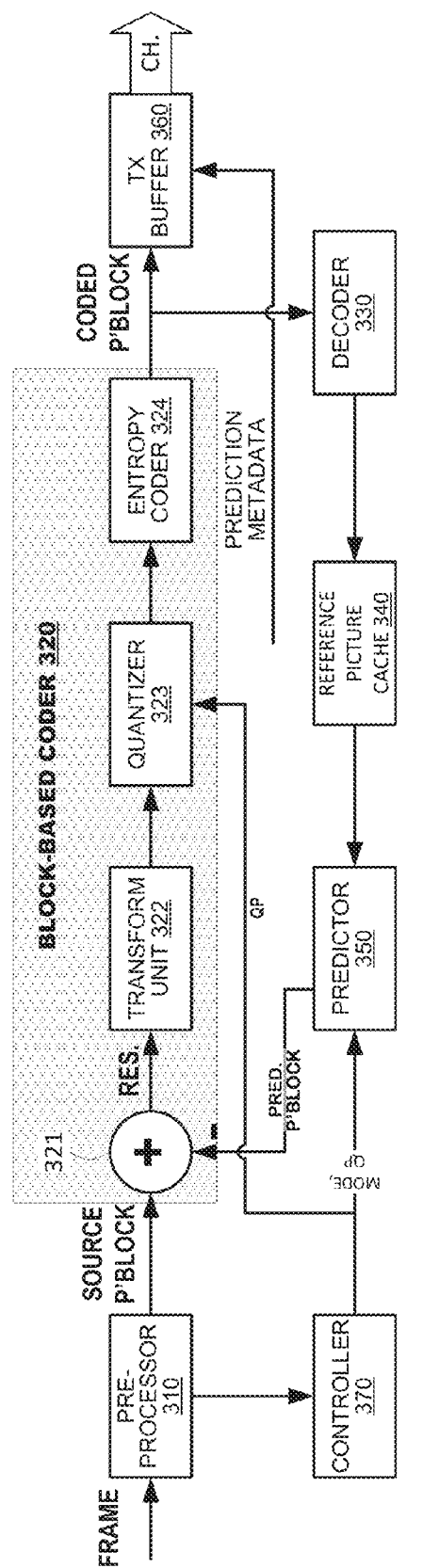
FIG. 3 is a simplified block diagram of a video coding system of another embodiment of the present invention, illustrating the operation of pixel-block coding operations.

Embodiments of the present invention provide video coding systems and methods that protect against various artifacts (e.g., banding artifacts) in decoded frame content. The embodiments to protect against introducing artifacts include pre-processing the input video frame, controlling the encoding parameters and/or post-processing the decoded video frame. A method for encoding a frame may include calculating a dark-scene score for the frame based on measured statistics of the frame. The dark-scene score may be compared to a threshold to determine if the banding artifacts may be present in the frame. If the dark scene score is above the threshold, filtering parameters for the frame may be attenuated to reduce the amount of noise filtered in the frame. The frame may be filtered based on the filtering parameters and encoded.

FIG. 1 illustrates a simplified block diagram of a video coding system 100 according to an embodiment of the present invention. The system 100 may include at least two terminals 110-120 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data. Unidirectional data transmission is common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 are illustrated as servers, personal computers and smart phones but the principles of the present invention are not so limited. Embodiments of the present invention find application with laptop computers, tablet computers, media players and/or dedicated video conferencing equipment. The network 150 represents any number of networks that convey coded video data among the terminals 110-140, including for example wireline and/or wireless communication networks. The communication network 150 may exchange data in circuit-switched and/or packet-switched channels. Representative networks include telecommunications networks, local area networks, wide area networks and/or the Internet. For the purposes of the present discussion, the architecture and topology of the network 150 is immaterial to the operation of the present invention unless explained hereinbelow.

FIG. 2 is a functional block diagram of a video coding system 200 according to an embodiment of the present invention. The system 200 may include a video source 210 that provides video data to be coded by the system 200, a pre-processor 220, a video coder 230, a transmitter 240 and a controller 250 to manage operation of the system 200.

The video source 210 may provide video to be coded by the system 200. In a media serving system, the video source 210 may be a storage device storing previously prepared video. In a videoconferencing system, the video source 210 may be a camera that captures local image information as a video sequence. Video data typically is provided as a plurality of individual frames that impart motion when viewed in sequence. The frames themselves typically are organized as a spatial array of pixels.

The pre-processor 220 may perform various analytical and signal conditioning operations on video data. The pre-processor 220 may parse input frames into color components (for example, luminance and chrominance components) and also may parse the frames into pixel blocks, spatial arrays of pixel data, which may form the basis of further coding. The pre-processor 220 also may apply various filtering operations to the frame data to improve efficiency of coding operations applied by a video coder 230.

The pre-processor 220 may search for video content in the source video sequence that is likely to generate artifacts when the video sequence is coded by the system 200, then decoded and displayed by another terminal. "Banding" is one of the artifacts that the pre-processor 220 may identify. Banding may occur in areas of source frames that are generally smooth and exhibit a gradual transition within the area. When such frames are coded, then decoded and displayed, a gradual transition may not be preserved; instead, the transition may be displayed as a plurality of discrete changes in the area of the reconstructed frame. The pre-processor 220 may identify to the controller 250 portions of the video sequence and/or portion of a frame in which banding artifacts may arise.

The video coder 230 may perform coding operations on the video sequence to reduce the video sequence's bit rate. The video coder 230 may include a coding engine 232, a local decoder 233, a reference picture cache 234, a predictor 235 and a controller 236. The coding engine 232 may code the input video data by exploiting temporal and spatial redundancies in the video data and may generate a datastream of coded video data, which typically has a reduced bit rate as compared to the datastream of source video data. As part of its operation, the video coder 230 may perform motion compensated predictive coding, which codes an input frame predictively with reference to one or more previously-coded frames from the video sequence that were designated as "reference frames." In this manner, the coding engine 232 codes differences between pixel blocks of an input frame and pixel blocks of reference frame(s) that are selected as prediction reference(s) to the input frame.

The local decoder 233 may decode coded video data of frames that are designated as reference frames. Operations of the coding engine 232 typically are lossy processes. When the coded video data is decoded at a video decoder (not shown in FIG. 2), the recovered video sequence typically is a replica of the source video sequence with some errors. The local decoder 233 replicates decoding processes that will be performed by the video decoder on reference frames and may cause reconstructed reference frames to be stored in the reference picture cache 234. In this manner, the system 200 may store copies of reconstructed reference frames locally that have common content as the reconstructed reference frames that will be obtained by a far-end video decoder (absent transmission errors).

The predictor 235 may perform prediction searches for the coding engine 232. That is, for a new frame to be coded, the predictor 235 may search the reference picture cache 234 for image data that may serve as an appropriate prediction reference for the new frames. The predictor 235 may operate on a pixel block-by-pixel block basis to find appropriate prediction references. In some cases, as determined by search results obtained by the predictor 235, an input frame may have prediction references drawn from multiple frames stored in the reference picture cache 234.

The controller 236 may manage coding operations of the video coder 230, including, for example, selection of coding parameters to meet a target bit rate of coded video. Typically, video coders operate according to constraints imposed by bit rate requirements, quality requirements and/or error resiliency policies. The controller 236 may select coding parameters for frames of the video sequence in order to meet these constraints. For example, the controller 236 may assign coding modes and/or quantization parameters to frames and/or pixel blocks within frames.

The transmitter 240 may buffer coded video data to prepare it for transmission to the far-end terminal (not shown) via a communication channel 260. The transmitter 240 may merge coded video data from the video coder 230 with other data to be transmitted to the terminal, for example, coded audio data and/or ancillary data streams (sources not shown).

The controller 250 may manage operation of the system 200. During coding, the controller 250 may assign to each frame a certain frame type (either of its own accord or in cooperation with the controller 236), which can affect the coding techniques that are applied to the respective frame. For example, frames often are assigned as one of the following frame types:

An Intra Frame (I frame) is one that is coded and decoded without using any other frame in the sequence as a source of prediction.

A Predictive Frame (P frame) is one that is coded and decoded using earlier frames in the sequence as a source of prediction.

A Bidirectionally Predictive Frame (B frame) is one that is coded and decoded using both earlier and future frames in the sequence as sources of prediction.

Frames commonly are parsed spatially into a plurality of pixel blocks (for example, blocks of 4×4, 8×8 or 16×16 pixels each) and coded on a pixel block-by-pixel block basis. Pixel blocks may be coded predictively with reference to other coded pixel blocks as determined by the coding assignment applied to the pixel blocks' respective frames. For example, pixel blocks of I frames can be coded non-predictively or they may be coded predictively with reference to pixel blocks of the same frame (spatial prediction). Pixel blocks of P frames may be coded non-predictively, via spatial prediction or via temporal prediction with reference to one previously coded reference frame. Pixel blocks of B frames may be coded non-predictively, via spatial prediction or via temporal prediction with reference to one or two previously coded reference frames.

The video coder 230 may perform coding operations according to a predetermined protocol, such as H.263, H.264, MPEG-2, or HEVC. In its operation, the video coder 230 may perform various compression operations, including predictive coding operations that exploit temporal and spatial redundancies in the input video sequence. The coded video data, therefore, may conform to a syntax specified by the protocol being used.

In an embodiment, the transmitter 240 may transmit additional data with the encoded video. The additional data may include collected statistics on the video frames or details on operations performed by the pre-processor 220. The additional data may be transmitted in a channel established by the governing protocol for out-of-band data. For example, the transmitter 240 may transmit the additional data in a supplemental enhancement information (SEI) channel and/or a video usability information (VUI) channel. Alternatively, the video coder 230 may include such data as part of the encoded video frames.

To code frames of a source video sequence, frames may be parsed into "pixel blocks," regular arrays of pixel data, and may be coded on a pixel block-by-pixel block basis. FIG. 3 is a simplified block diagram of a video coding system 300 of another embodiment of the present invention, illustrating the operation of pixel-block coding operations. The system 300 may include a pre-processor 310, a block-based coder 320, a reference frame decoder 330, a reference picture cache 340, a predictor 350, a transmit buffer 360 and a controller 370.

As discussed above, the pre-processor 310 may parse each frame into pixel blocks. The pre-processor 310 also may identify regions within frames in which banding is likely to occur and it may identify such regions to a controller 370. Based on the identified regions within frames in which banding is likely to occur, the pre-processor 310 may designate the frame as likely to have banding.

The block-based coder 320 may include a subtractor 321, a transform unit 322, a quantizer 323 and an entropy coder 324. The subtractor 321 may generate data representing a difference between the source pixel block and a reference pixel block developed for prediction. The subtractor 321 may operate on a pixel-by-pixel basis, developing residuals at each pixel position over the pixel block. Non-predictively coded blocks may be coded without comparison to reference pixel blocks, in which case the pixel residuals are the same as the source pixel data.

The transform unit 322 may convert the source pixel block data to an array of transform coefficients, such as by a discrete cosine transform (DCT) process or a wavelet transform. The quantizer unit 323 may quantize (divide) the transform coefficients obtained from the transform unit 322 by a quantization parameter Qp. The entropy coder 324 may code quantized coefficient data by run-value coding, run-length coding or the like. Data from the entropy coder may be output to the channel as coded video data of the pixel block. The reference frame decoder 330 may decode pixel blocks of reference frames and assemble decoded data for such reference frames. Decoded reference frames may be stored in the reference picture cache 340.

The predictor 350 may generate and output prediction blocks to the subtractor 321. The predictor 350 also may output metadata identifying type(s) of predictions performed. For inter-prediction coding, the predictor 350 may search among the reference picture cache for pixel block data of previously coded and decoded frames that exhibits strong correlation with the source pixel block. When the predictor 350 finds an appropriate prediction reference for the source pixel block, it may generate motion vector data that is output to the decoder as part of the coded video data stream. The predictor 350 may retrieve a reference pixel block from the reference cache that corresponds to the motion vector and may output it to the subtractor 321. For intra-prediction coding, the predictor 350 may search among the previously coded and decoded pixel blocks of the same frame being coded for pixel block data that exhibits strong correlation with the source pixel block. Operation of the predictor 350 may be constrained by a mode selection provided by the controller 370. For example, if a controller selects an inter-coding mode for application to a frame, the predictor 350 will be constrained to use inter-coding techniques. If the controller selects an inter-prediction mode for the frame, the predictor may select among inter-coding modes and intra-coding modes depending upon results of its searches.

A transmit buffer 360 that accumulates metadata representing pixel block coding order, coded pixel block data and metadata representing coding parameters applied to the coded pixel blocks. The metadata can include prediction modes, motion vectors and quantization parameters applied during coding. Accumulated data may be formatted and transmitted to the channel.

A controller 370 may manage coding of the source video, including selection of a coding mode for use by the predictor 350 and selection of quantization parameters to be applied to pixel blocks.

Figure 4:
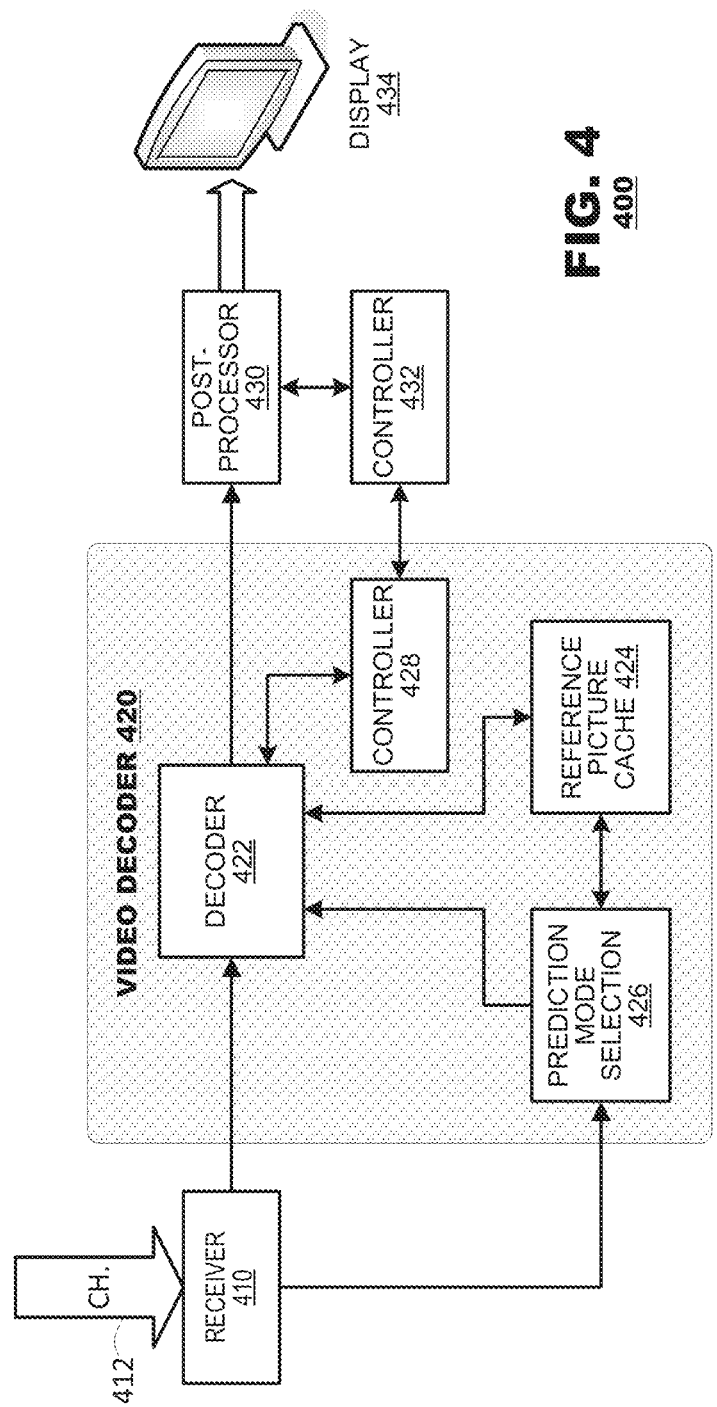
FIG. 4 is a functional block diagram of a video decoding system according to an embodiment of the present invention.

FIG. 4 is a functional block diagram of a video decoding system 400 according to an embodiment of the present invention. The video decoding system 400 may include a receiver 410 that receives encoded video data, a video decoder 420, a post-processor 430, a controller 432 to manage operation of the system 400 and a display 434 to display the decoded video data.

The receiver 410 may receive video to be decoded by the system 400. The encoded video data may be received from a channel 412. The receiver 410 may receive the encoded video data with other data, for example, coded audio data and/or ancillary data streams. The receiver 410 may separate the encoded video data from the other data.

The video decoder 420 may perform decoding operation on the video sequence received from the receiver 410. The video decoder 420 may include a decoder 422, a reference picture cache 424, and a prediction mode selector 426 operating under control of controller 428. The decoder 422 may reconstruct coded video data received from the receiver 410 with reference to reference pictures stored in the reference picture cache 424. The decoder 422 may output reconstructed video data to the post-processor 430, which may perform additional operations on the reconstructed video data to condition it for display. Reconstructed video data of reference frames also may be stored to the reference picture cache 424 for use during decoding of subsequently received coded video data.

The decoder 422 may perform decoding operations that invert coding operations performed by the video coder 230 (shown in FIG. 2). The decoder 422 may perform entropy decoding, dequantization and transform decoding to generate recovered pixel block data. Quantization/dequantization operations are lossy processes and, therefore, the recovered pixel block data likely will be a replica of the source pixel blocks that were coded by the video coder 230 (shown in FIG. 2) but may include some error. For pixel blocks coded predictively, the transform decoding may generate residual data; the decoder 422 may use motion vectors associated with the pixel blocks to retrieve predicted pixel blocks from the reference picture cache 424 to be combined with the prediction residuals. The prediction mode selector 426 may identify a temporal prediction mode being used for each pixel block of an encoded frame being decoded and request the needed data for the decoding to be read from the reference picture cache 424. Reconstructed pixel blocks may be reassembled into frames and output to the post-processor 430.

The post-processor 430 may perform video processing to condition the recovered video data for rendering, commonly at a display 434. Typical post-processing operations may include applying deblocking filters, edge detection filters, ringing filters and the like. The post-processor 430 may output recovered video sequence for rendering on the display 434 or, optionally, stored to memory (not shown) for later retrieval and display. The controller 432 may manage operation of the system 200.

The video decoder 420 may perform decoding operations according to a predetermined protocol, such as H.263, H.264, MPEG-2, HEVC. In its operation, the video decoder 420 may perform various decoding operations, including predictive decoding operations that exploit temporal and spatial redundancies in the encoded video sequence. The coded video data, therefore, may conform to a syntax specified by the protocol being used.

In one embodiment, the receiver 410 may receive additional data with the encoded video. The additional data may include collected statistics on the video frames or details on operations performed by the pre-processor 220 (shown in FIG. 2). The additional data may be received via a channel established by the governing protocol for out-of-band data. For example, the receiver 410 may receive the additional data via supplemental enhancement information (SEI) channel and/or video usability information (VUI) channel. Alternatively, the additional data may be included as part of the encoded video frames. The additional data may be used by the video decoder 420 and/or the post-processor 430 to properly decode the data and/or to more accurately reconstruct the original video data.

Figure 5:
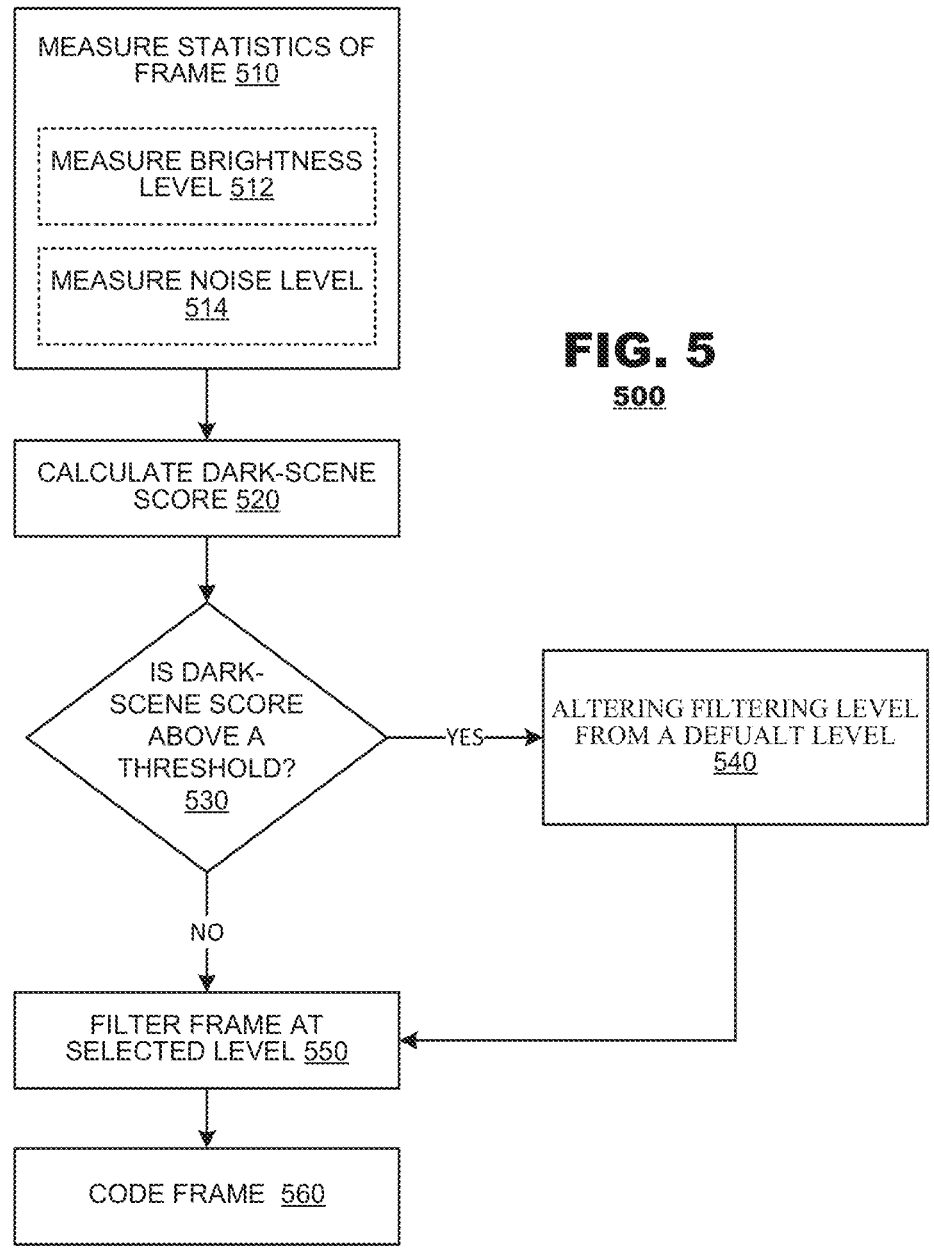
FIG. 5 illustrates a method of detecting frames that may include banding artifacts in a video and processing the video to mitigate such effects.

FIG. 5 illustrates a method 500 of detecting frames that may include banding artifacts in a video and processing the video to mitigate such effects. The method may include measuring statistics of a frame (box 510), calculating a dark-scene score (box 520), determining if the dark-scene score is above a threshold (box 530), if it is determined that the dark-scene score is above the threshold, altering filtering level from a default level (box 540), filtering the frame at selected level (box 550) and coding the frame (box 560).

The method 500 may begin by measuring statistics of a frame (box 510) to determine if the frame or a region of the frame is a candidate for having banding artifacts. The statistics of the frame may be measured to determine if the frame may include regions that could introduce artifacts into the decoded frame. Measuring the statistic of the frame (box 510) may include measuring the brightness level (box 512) and the noise level (box 514) of the frame. The brightness level and the noise level may be measured because areas with low noise and dark scenes may include banding artifacts after decoding. In one embodiment, the brightness level and the noise level may be measured for each pixel block in the frame. A spatio-temporal filter may be used to measure the statistics of the frame.

Once the statistics of the frame are measured, the method may calculate the dark-scene score (box 520) of the frame. The dark-scene score may be calculated based the statistics of the frame (e.g., brightness level and the noise level of the frame). The dark-scene score may indicate whether the brightness level of the frame is below a predetermined brightness threshold and whether the noise level of the frame is below a predetermined noise threshold.

In one embodiment, the dark-scene score may be calculated by determining the number of pixel blocks in the frame that have a brightness level and a noise level below predetermined brightness and noise thresholds, respectively. The number of pixel blocks that have low brightness level and low noise level may correspond to the dark-scene score. The dark-scene score may also be calculated by determining a percentage of pixel blocks from the frame that have low brightness level and/or low noise level. Thus, if a certain percentage of the frames have the low brightness level and/or the low noise level, the frame may be a candidate for having banding artifacts.

In another embodiment, the dark-scene score may be calculated for a predetermined region of the frame. For example, the dark-scene score may be calculated for a region of the frame that has no motion or limited amount of motion. Motion between subsequent frames may be used to determined regions with no motion or limited amount of motion.

The calculated dark-scene score may be compared to a threshold (box 530) to determine if the frame is a candidate for having banding artifacts. If the dark-scene score is equal to or above the threshold (yes in box 530), then the filter applied to the frame may be altered from a default level (box 540). The default value may be a preset value or a value determined from the content of the frame (e.g., amount of noise in the frame and/or motion). The filter may be applied to the frame to filter out noise in the frame. If the dark-scene score is equal to or above the threshold, then the filter applied to the frame may be attenuated to lower the filtering strength. The filter may be attenuated from a default value in proportion to the value of the dark-scene score. Thus, a higher dark-scene score may correspond to a higher attenuation of the filter. In one embodiment, the filter may be turned off to mitigate the banding artifacts. Attenuating the filter may preserve the details in the low-noise and dark frames or regions of the frames. If the dark-scene score is below the threshold (no in box 530), then the strength of the filter may be reset to a default value or maintained at previous levels.

The filter may be applied to the frame at the selected level (box 550) before the frame is encoded. The filter may be a spatio-temporal filter. If the filter level is not altered, then the default value of the filter may be applied to the frame (box 550). The altered filter may be applied (box 550) to the whole frame or to a region of the frame that is identified as being a candidate for the banding artifacts. In one embodiment, an attenuated filter may be applied to the regions of the frame that are identified as being a candidate for the banding artifacts and a default filter, without being attenuated, may be applied to the remaining regions of the frame.

Once the filter is applied to the frame (box 550), the frame may be encoded by the encoder (box 560). Because the filter does not filter out all of the noise from the frame that may include artifacts, the video coder may be forced to use more bits for these frames or regions. The steps (boxes 510-540) performed before encoding the frame may be performed by the pre-processor 220, shown in FIG. 2.

FIG. 6 illustrates another embodiment of a method 600 of detecting frames that may include banding artifacts in a video and processing the video to mitigate such effects. The method may include measuring statistics of a frame (box 610), identifying frame(s) or pixel block(s) that may have banding based on the measured statistics (box 620), adding noise to identified frame(s) or pixel block(s) (box 630), and coding the frame (box 640).

The method 600 may begin by measuring statistics of a frame (box 610) to determine if the frame or a region of the frame is a candidate for having banding artifacts. The statistics of the frame may be measured to determine if the frame may include regions that could introduce artifacts into the decoded frame. Measuring the statistic of the frame (box 610) may include measuring the noise level (box 614) of the frame or regions of the frame. In one embodiment, the brightness level (box 612) may also be measured for the frame or regions of the frame. In one embodiment, the noise level and/or the brightness level may be measured for each pixel block in the frame.

Once the statistics of the frame are measured, the method may identify frame(s) or pixel block(s) that may have banding based on the statistics of the frame (box 620). The frames or regions may be identified based on the noise level and/or brightness level of the frame or individual pixel blocks. In one embodiment, the frames with possible banding artifacts may be identified by comparing an anti-banding noise threshold to the number of pixel blocks in the frame that have a noise level below a predetermined noise threshold. If a predetermined number of pixel blocks with noise are below the anti-banding noise threshold, then the frame may include banding artifacts after decoding. In another embodiment, a percentage of pixel blocks from the frame that have a low noise level may be used to determine a frame that may include banding artifacts. In other embodiments, the brightness level in the frame may be included in the determination of frames or regions that may include banding artifacts.

Noise may be added to frames or regions of the frames that are identified as candidates for having banding artifacts (box 630). The amount of noise that is added may be just enough to prevent banding artifacts in the identified frame or regions of the frame. The amount of noise that is added may be determined based on the statistics of the frame or a region of the frame (e.g., noise level, brightness and/or bitstream size).

In one embodiment, the noise may be added (box 630) by increasing the amount of dither noise that is added from a default value to have sufficient anti-banding noise in the frame. The dither noise may be added during the conversion of the frame bitstream (box 650) (e.g., from 10 bit to 8 bit). The amount of dither noise that is added (e.g., quantity or number of bits to which dither noise is added) may be determined based on the statistics of the frame (e.g., amount of noise in the frame determined in step 610). The dither noise may be added to the frame bitstream before the conversion of the bitstream is performed by the pre-processor 220 (shown in FIG. 2).

In one embodiment, if a frame is identified to have banding (e.g., frame that included dark regions and/or regions with low noise), a determination may be made to determine if the default amount of dither noise that will be added to the frame is above a predetermined threshold. The threshold may correspond to the amount of dither that will be sufficient to mitigate the banding artifacts. If the default amount of dither noise that will be added to the frame is above the predetermined threshold, the default dither value that is added to the frame or regions of the frame may be increased.

Once the noise is added to the identified frame or region of the frame (box 630), the frame may be encoded by the encoder (box 640). Because noise is added to a frame that may include artifacts, the video coder may be forced to use more bits for these frames or regions of the frame. The steps (boxes 610-630) performed before encoding the frame may be performed by the pre-processor 220, shown in FIG. 2.

FIG. 7 illustrates another embodiment of a method 700 of detecting frames that may include banding artifacts in a video and processing the video to mitigate such effects. In contrast to the method shown in FIG. 6 which may be performed by the pre-processor 220 shown in FIG. 2, the embodiment shown in FIG. 7 may be performed by the post-processor 430 shown in FIG. 4.

The method 700 may include measuring statistics of a decoded frame (box 710), identifying frame(s) or pixel block(s) that may have banding based on the measured statistics (box 720), adding noise to identified frame(s) or pixel block(s) (box 730), and providing the frame to a display (box 740).

The method 700 may begin by measuring statistics of a frame (box 710) to determine if the frame or a region of the frame is a candidate for having banding artifacts. Measuring statistics of the frame (box 710) may include measuring the noise level (box 714) of the frame or regions of the frame. In one embodiment, the brightness level (box 712) may also be measured for the frame or regions of the frame. In one embodiment, the noise level and/or the brightness level may be measured for each pixel block in the frame.

Once the statistics of the frame are measured, the method may identify frame(s) or pixel block(s) that may have banding based on the statistics of the frame (box 720). The frames or regions may be identified based on the noise level and/or brightness level of the frame or individual pixel blocks. In one embodiment, the frames with possible banding artifacts may be identified by comparing an anti-banding noise threshold to the number of pixel blocks in the frame that have a noise level below predetermined noise threshold. If a predetermined number of pixel blocks with noise are below the anti-banding noise threshold, then the frame may include banding artifacts. In another embodiment, a percentage of pixel blocks from the frame that have a low noise level may be used to determine a frame that may include banding artifacts.

Noise may be added to frames or regions of the frames that are identified as candidates for having banding artifacts (box 730). The amount of noise that is added may be just enough to prevent banding artifacts in the identified frame or regions of the frame. The amount of noise that is added may be determined based on the statistics of the frame or region of the frame (e.g., noise level, brightness and/or bitstream size).

In one embodiment, the noise may be added (box 730) by increasing the amount of dither noise that is added from a default value to have sufficient anti-banding noise in the frame. The dither noise may be added during the conversion of the frame bitstream (box 750) (e.g., from 10 bit to 8 bit). The conversion of the decoded frame bitstream (box 750) may be performed to convert the decoded frame bitstream to a bitstream that can be displayed by a display device. The amount of dither noise that is added (e.g., quantity or number of bits to which dither noise is added) may be determined based on the statistics of the frame (e.g., amount of noise in the frame determined in step 710). The dither noise may be added to the frame bitstream before the conversion of the bitstream is performed by the post-processor 430 (shown in FIG. 4). In one embodiment, the noise may be added (box 730) to a bitstream that provides video data in a YUV color space.

Once the noise is added to the identified frame or region of the frame (box 730), the frame may be converted to the appropriate bitstream (box 750) and/or provide the frame with the added noise to the display (step 740). For example, the frame may be converted from format used to transmit the frames over the communication channel (e.g., 10 bit format) to the format of the display device (e.g., (8 bit format).

In another embodiment, measuring statistics of the frame (box 710) and/or the identification of frames or regions with banding (box 720) may be performed on the original frame by the pre-processor 220 and or video encoder 230 (shown in FIG. 2) before it is encoded by the video coder. These statistics and/or the results of the analysis of the frame may be included as part of the metadata sent with the encoded video data to the decoder. The post-processor 430 (shown in FIG. 4) may use the metadata to determine to which frames and/or regions of the frame to add noise to mitigate for banding artifacts. The metadata may be received from the encoder via a supplemental data channel (e.g., a SEI channel and/or a VUI channel). The metadata may include, for example, the amount of noise in the original frame, regions of the frame that include low brightness and/or low noise, whether the image may include banding artifacts, type of coding performed on the frame, amount of noise added to the image, and/or on and off flags for different part of the video.

FIG. 8 illustrates another embodiment of a method 800 for detecting frames that may include banding artifacts in a video and processing the video to mitigate such effects.

The method 800 may include measuring statistics of a frame (box 810), identifying frame(s) or pixel block(s) that may have banding based on the measured statistics (box 820), adjusting encoding parameters on identified frame or pixel block(s) (box 830), and coding the frame (box 840).

The method 800 may begin by measuring statistics of a frame (box 810) to determine if the frame or a region of the frame is a candidate for having banding artifacts. Measuring the statistic of the frame (box 810) may include measuring the noise level (box 814) of the frame or regions of the frame and/or measuring the brightness level (box 812) for the frame or regions of the frame. In one embodiment, the noise level and/or the brightness level may be measured for each pixel block in the frame.

Once the statistics of the frame are measured, the method 800 may identify a frame or pixel block(s) that may have banding based on the statistics of the frame (box 820). The frames or regions may be identified based on the noise level and/or brightness level of the frame or individual pixel blocks.

The coding parameters may be adjusted (box 830) for frames and/or regions that are identified as candidates for having banding artifacts. In one embodiment, the quantization parameter(s) QP used to encode the frames and/or regions that are identified as candidates for having banding artifacts may be adjusted from a default level. The defaults levels may be determined from the image content, interframe frame dependencies, intraframe dependencies, and/or type of coding performed on the frame. The default quantization parameter(s) QP may be lowered for frames and or regions that may have banding artifacts. The quantization parameter QP may be lowered in proportion to the amount of banding that may be caused in the frame or region of the frame. For example, the quantization parameter(s) QP may be lowered more for frames that have lower noise and darker scenes. The quantization parameter QP may be lowered more for frames that have larger areas of the frame with low noise and dark scenes.

Lowering the quantization parameter QP may allocate more bits to the frame or regions of the frame that may be easily banded. Allocating more bits to these regions, which may be regions that are dark and with little noise, may preserve the details needed to prevent banding in the frame. In one embodiment, while the regions of the frame which may be easily banded are coded with a quantization parameter QP that is lowered, other regions of the frame may be coded with a quantization parameter QP that is increased.

Allocating more bits to the frame or regions of the frame that may be easily banded also provides more motion compensation references for frames that may use the frame as a reference frame. Thus, the benefits of coding easily bonded areas with more bits carry over to other frames in the frame sequence. In one embodiment, a frame following a scene change may be coded with lower quantization parameter QP from the default quantization parameter QP. In another embodiment, the encoder may refresh the quality of easily banded frames and/or regions (i.e., lower the quantization parameter) every predetermined number of frames by increasing the quantization parameter QP from the default value.

Once the encoder parameters are adjusted (box 830), the frame may be encoded by the encoder (box 840).

FIG. 9 illustrates another embodiment of a method 900 of detecting frames that may include banding artifacts in a video and processing the video to mitigate such effects. The method may include measuring statistics of a frame (box 910), identifying frames or pixel block(s) that may include banding (box 920), applying transform to masking values (box 930), and encoding the frame (box 940).

The method 900 may begin by measuring statistics of a frame (box 910) to determine if the frame or a region of the frame is a candidate for having banding artifacts. Measuring the statistic of the frame (box 910) may include measuring the brightness level and/or the noise level of the frame. In one embodiment, the brightness level and the noise level may be measured for each pixel block in the frame. A spatio-temporal filter may be used to measure the statistics of the frame.

Once the statistics of the frame are measured, the method may identify frame(s) or pixel block(s) that may include banding based on the statistics of the frame (box 920). The determination may include determining if the brightness level of the frame is below a predetermined brightness threshold and/or whether the noise level of the frame is below a predetermined noise threshold. The determination may include determining the number of pixel blocks that have a low brightness and/or low noise or a percentage of the pixel blocks in the frame that have a low brightness and/or low noise.

The identified regions of the frame that may include banding may correspond to areas that are dark and have low contrast. These areas are typically represented by a low number of bits when the frame is encoded. To increase the number of bits used to represent these areas, a transform may be applied to the masking values (box 930). The masking value may be determined by the video coder based on intra-frame and inter-frame dependencies. The transform may be a sub-linear function, for example, a square root function. Applying the transform to the masking values may allocate more bits to the areas of the frame that may include banding artifacts. Applying the transform may level out the allocation of the bits in the different areas of the frame. The transform may increase a masking value in areas of the frame that have a high contrast and are bright and may decrease a masking value in areas of the frame that have a low contrast and are dark. Thus, a higher quantization parameter QP will be applied to bright areas with high contrast and a lower quantization parameter QP will be applied to dark areas with low contrast.

Once the transform is applied to the masking values (box 930), the frame may be encoded by the encoder (box 940).

In an alternative embodiment, the transform may be applied to each frame in the image sequence, without making a determination as to whether the frame may include areas with banding artifacts after decoding.

FIG. 10 illustrates a method 1000 of detecting fading in a video and adjusting the encoding based on the detected fading. The method 1000 may include detecting fading in a frame sequence (box 1010), adjusting encoder parameters (1020) and coding the frames (box 1030).

The fading in a frame sequence may be detected (box 1010) by comparing the statistics for a plurality of frames. The fading may be detected by cross correlating the brightness and/or variance of two or more frames.

If fading is detected, the encoding parameters of the encoder may be adjusted (box 1020) to take account of the fading in the frame sequence. The encoding parameters may be adjusted because if no compensation is made for the fading, the video encoder or the pre-processor may generate significant motion error based on the analysis of the frames. The motion error may cause high motion estimation in the frames, and as a result a high quantization QP parameter may be set by the encoder to the frames.

To provide a good visual representation of the fading, the motion masking value that is applied to the frame may be lowered (box 1020), when fading is detected. Lowering the motion masking value may reduce the quantization parameter QP that is applied to the frame. Thus, more bits will be allocated for encoding the frames (box 1030) to provide a good visualization of the fading in the frame sequence. If the degree of fading is detected in step 1010, the degree of lowering the motion masking value may be adjusted in proportion to the amount of fading detected in the frame sequence.

FIG. 11 illustrates another embodiment of a method 1100 for detecting frames that may include banding artifacts in a video and processing the video to mitigate such effects. The method may include measuring statistics of a frame (box 1110), identifying frame or pixel block(s) that may include banding based on the measured statistics (box 1120), applying adaptive mapping (box 1130), encoding frame (box 1140), transmitting encoded data (box 1150), decoding frame (box 1160), and applying inverse adaptive mapping (box 1170).

The method 1100 may begin by measuring statistics of a frame (box 1110) to determine if the frame or a region of the frame is a candidate for having banding artifacts. Measuring the statistic of the frame (box 1110) may include measuring the brightness level and/or the noise level of the frame. In one embodiment, the brightness level and the noise level may be measured for each pixel block in the frame. A spatio-temporal filter may be used to measure the statistics of the frame.

Once the statistics of the frame are measured, the method may identify frame(s) or pixel block(s) that may include banding based on the statistics of the frame (box 1120). The determination may include determining if the brightness level of the frame is below a predetermined brightness threshold and/or whether the noise level of the frame is below a predetermined noise threshold. The determination may include determining the number of pixel blocks that have a low brightness and/or low noise or a percentage of the pixel blocks in the frame that have a low brightness and/or low noise.

The identified frames and/or regions of the frame that may include banding may be processed by applying adaptive mapping (box 1130). The adaptive mapping may include applying area-adaptive mapping to preserve the details in dark and low contras regions before encoding the frame. For example, a nonlinear gamma mapping may be applied before the frame is encoded. The area-adaptive mapping may provide regions that have a low contrast (e.g., dark region with little detail) a larger contrast.

After the adaptive mapping is applied to the frame, the frame may be encoded (box 1140) and transmitted (box 1150) to the device including a decoder via a network. The encoded data that is transmitted may include the details of the adaptive mapping performed on the frame. For example, the encoded data may include the type of adaptive mapping performed on the frame and/or the areas of the frame on which the adaptive mapping is performed. The details of the adaptive mapping may be signaled in combination with the MacroBlock structure in the H.264 standard, or with the coding tree block structure in the HEVC standard. For example, in the H.264 standard as a per-MB signaling, and in the HEVC standard signaled for a variable sized coding block. In another embodiment, the details of the adaptive mapping may be transmitted via a supplemental data channel (e.g., a SEI channel and/or a VUI channel).

Once the encoded data is received, a decoder may decode the frame (box 1160). The decoded frame may be processed by a post-processor by applying an inverse of the adaptive mapping to the decoded frame (box 1170). The details of performing the inverse of the adaptive mapping may be received along with the encoded data or via the supplemental data channel. After the inverse of the adaptive mapping is applied to the decoded frame, the frame may correspond to the original frame.

While the above embodiments are discussed with reference to mitigate for banding artifacts in the decoded image, the above embodiments may be performed to mitigate for other types of artifacts that may be introduced into the decoded frame.

In the above discussed embodiment, measuring the statics of a frame may include encoding the original frame, decoding the encoded frame in the video coder 230 (shown in FIG. 2), and comparing the original frame the decoded frame by the video coder 230.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the disclosed embodiments. Other applications of the present invention may be embodied as a hybrid system of dedicated hardware and software components.

The exemplary methods and computer program instructions may be embodied on a non-transitory machine readable storage medium. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device.

It will be appreciated that in the development of any actual implementation (as in any development project), numerous decisions must be made to achieve the developers' specific goals (e.g., compliance with system and business related constraints), and that these goals will vary from one implementation to another. It will also be appreciated that such development efforts might be complex and time consuming, but would nevertheless be a routine undertaking for those of ordinary skill in the digital video capture, processing and distribution field having the benefit of this disclosure.

Although the processes illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

It is to be understood that the above description is intended to be illustrative, and not restrictive. For example, the above described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

We claim:

1. A method for encoding a frame in a sequence of frames, comprising:
    measuring statistics of the frame;
    based on the measured statistics, estimating a likelihood that coding of the frame will cause banding artifacts on decoding based on comparing an anti-banding noise threshold to a number of pixel blocks in the frame that have a noise level below a selected noise threshold;
    adding noise to the frame based on the estimating;
    calculating a dark-scene score for the frame based on the measured statistics;
    comparing the dark-scene score to a threshold;
    when the comparison indicates that the frame is dark, altering filtering parameters for the frame from a default level to reduce an amount of noise filtered from the frame;
    filtering the frame based on the altered filtering parameters; and
    encoding the filtered frame.

2. The method of claim 1, wherein measuring statistics of the frame includes measuring a noise level of the frame.

3. The method of claim 1, wherein measuring statistics of the frame includes measuring a brightness level of the frame.

4. The method of claim 1, wherein calculating the dark-scene score includes determining a region of the frame having motion below a predetermined motion threshold and calculating the dark scene score for the region having motion below the predetermined motion threshold.

5. The method of claim 1, wherein the dark-scene score represents a number of pixel blocks in the frame that have a brightness level below a brightness threshold and the noise level below the selected noise threshold.

6. The method of claim 1, wherein the filtering parameters are altered in proportion to the value of the dark-scene score.

7. The method of claim 1, wherein altering the filtering parameters comprises reducing a strength of the filter as compared to the default level.

8. The method of claim 1, wherein estimating the likelihood that coding of the frame will cause the banding artifacts on decoding includes determining a number of pixel blocks in the frame that have a brightness level below a predetermined brightness level.

9. The method of claim 1, wherein estimating the likelihood that coding of the frame will cause the banding artifacts on decoding includes determining a number of pixel blocks in the frame that have the noise level below the selected noise threshold.

10. The method of claim 1, wherein dither noise is added to the frame and the amount of dither noise that is added is determined based on the statistics of the frame.

11. The method of claim 1, wherein estimating the likelihood that coding of the frame will cause the banding artifacts on decoding includes determining regions of the frame that have likelihood to cause the banding artifacts on decoding and wherein noise is added to the regions based on the estimate.

12. The method of claim 1, further comprising:
    determining masking values for the frame, the masking value determining an allocation of bits in regions of the frame;
    based on the estimating the likelihood, altering the masking values to allocate more bits to areas of the frame that are candidate for introducing banding artifacts;
    determining quantization parameters for encoding the frame based on the masking values and frame dependencies; and
    encoding the frame using the quantization parameters.

13. The method of claim 12, wherein the masking values are altered by applying a sublinear function transform.

14. A non-transitory computer-readable medium embodied with computer-executable instructions for causing a computer to execute instructions, the computer instructions comprising:
    measuring statistics of a frame;
    based on the measured statistics, estimating a likelihood that coding of the frame will cause banding artifacts on decoding based on deter mining, a number of pixel blocks in the frame that have a brightness level below a predetermined brightness level;
    adding noise to the frame based on the estimating;
    calculating a dark-scene score for the frame based on the measured statistics;
    comparing the dark-scene score to a threshold;
    when the comparison indicates that the frame is dark, altering filtering parameters for the frame from a default level to reduce an amount of noise filtered from the frame;
    filtering the frame based on the altered filtering parameters; and
    encoding the filtered frame.

15. The non-transitory computer-readable medium of claim 14, wherein measuring statistics of the frame includes measuring a noise level of the frame.

16. The non-transitory computer-readable medium of claim 14, wherein measuring statistics of the frame includes a brightness level of the frame.

17. The non-transitory computer-readable medium of claim 14, wherein calculating the dark-scene score includes determining a region of the frame having motion below a predetermined motion threshold and calculating the dark scene score for the region having motion below the predetermined motion threshold.

18. The non-transitory computer-readable medium of claim 14, wherein the dark-scene score represents a number of pixel blocks in the frame that have the brightness level below the predetermined brightness threshold and a noise level below a noise threshold.

19. The non-transitory computer-readable medium of claim 14, wherein the filtering parameters are altered in proportion to the value of the dark-scene score.

20. The non-transitory computer-readable medium of claim 14, wherein altering the filtering parameters comprises reducing a strength of the filter as compared to the default level.

21. The method of claim 14, wherein estimating the likelihood that the coding of the frame will cause the banding artifacts on decoding includes comparing an anti-banding noise threshold to a number of pixel blocks in the frame that have a noise level below a selected noise threshold.

22. An apparatus, comprising:
a video coder to:
measure statistics of a frame,
based on the measured statistics, estimate a likelihood that coding of the frame will cause banding artifacts on decoding based on a comparison of an anti-banding noise threshold to a number of pixel blocks in the frame that have a noise level below a selected noise threshold;
add noise to the frame based on the estimate;
calculate a dark-scene score for the frame based on the measured statistics;
compare the dark-scene score to a threshold,
when the comparison indicates that the frame is dark, alter filtering parameters from for the frame from a default level to reduce an amount of noise filtered from the frame,
filter the frame based on the altered filtering parameters, and
encode the filtered frame; and
a transmitter to transmit the encoded frame.

23. The apparatus of claim 22, wherein measuring the statistics of the frame includes measuring a noise level of the frame.

24. The apparatus of claim 22, wherein measuring the statistics of the frame includes measuring a brightness level of the frame.

25. The apparatus of claim 22, wherein calculating the dark-scene score includes determining a region of the frame having motion below a predetermined motion threshold and calculating the dark scene score for the region having motion below the predetermined motion threshold.

26. The apparatus of claim 22, wherein the dark-scene score represents a number of pixel blocks in the frame that have a brightness level below a brightness threshold and the noise level below the selected noise threshold.

27. The apparatus of claim 22, wherein the filtering parameters are altered in proportion to the value of the dark-scene score.

28. The apparatus of claim 22, wherein altering the filtering parameters comprises reducing a strength of the filter as compared to the default level.

* * * * *